3,416,874
PRODUCTION OF POLYACRYLONITRILE-BASED
ARTICLES
Jean Baptiste Robin, Lyon, France, assignor to Crylor,
Paris, France, a French corporation
No Drawing. Filed Oct. 21, 1964, Ser. No. 405,571
Claims priority, application France, Feb. 21, 1964,
964,740
5 Claims. (Cl. 8—52)

ABSTRACT OF THE DISCLOSURE

Polyacrylonitrile-based articles, especially, fibres, of reduced flammability are made by heating the article, previously impregnated with 0.1 to 3% of cuprous ions, to 200° to 300° C.

This invention relates to the production of articles based on polyacrylonitrile.

It has been proposed to heat homopolymers or copolymers based on acrylonitrile without preliminary treatment to reduce their flammability, but this method has several disadvantages:

(i) It is very difficult to carry out, because during the heating, the article shows a marked tendency to ignite spontaneously; and (ii) it is very lengthy.

It is known to use cuprous ions to promote the dyeability of articles based on acrylonitrile polymers with acid dyestuffs.

It has now been found, and it is this which forms the subject of the present invention, that it is possible to obtain articles which are at least partially nonflammable and which, in addition have a deep shade which is exceptionally fast, to light and washing by heating acrylonitrile-based polymers pretreated with cuprous ions. These new articles are produced by contacting an article made of an acrylonitrile polymer selected from the class consisting of polymers, copolymers, and graft copolymers of 85 to 100% by weight of acrylonitrile and up to 15% by weight of a halogen free ethylenic monomer copolymerisable therewith, with an aqueous solution containing cuprous ions until the said article has 0.1 to 3% by weight of copper fixed thereon, and then heating the said article in the presence of a current of air at above 200° C. for from 1 minute to 12 hours until its flammability has been substantially reduced.

The nonflammability of the articles produced by the new process is determined by the "portique" test, described in the decree which appeared in the Official Journal of the French Republic, dated Jan. 16, 1961, page 611.

The polyacrylonitrile-based articles may be the polymers themselves, in the form obtained by polymerisation, e.g., a fine powder, as well as articles made from such polymers such as fibers, yarns, films and especially fabrics.

The process of the invention is the more surprising, since the literature indicates that copper sulphate does not have any catalytic action on the heat treatment of polyacrylonitrile.

Besides the properties already mentioned, the articles produced by the new process are insoluble in dimethylformamide and are not decolorised by strong reducing agents.

When the process of the invention is carried out on the polymer in powder form, this powder can optionally be moulded before the heat-treatment so that a shaped nonflammable article is obtained.

The article is first treated in a bath containing cuprous ions, obtained either directly by dissolving a cuprous salt or indirectly by reduction of a cupric compound in the bath itself. Any reducing agent which causes copper to change from the cupric to the cuprous state can be used.

For example, good results have been obtained with the hydroxylamine salts, hydrazine salts, glyoxal, bisulphites, zinc formaldehyde sulphoxylate, and metallic copper. Advantageously, the pH value of the bath is between 2 and 5, and the temperature of the bath is between 95 and 130°. The proportion of cuprous ions in the bath is ordinarily from 0.25 to 5%, preferably 1.5 to 3%, by weight of the article to be treated.

The quantity of copper fixed on the article must not be less than 0.1% in order to have a sufficient action, but it must not exceed 3% in order to preserve the mechanical qualities of the article. This cuprous copper may obviously be oxidised during the pyrolysis to the cupric state and be in this form in the finished product.

The duration of the heat treatment can vary within wide limits, depending on the treatment temperature and the desired final properties, both from the point of view of nonflammability and mechanical properties. Thus, an article treated with cuprous ions and heat-treated at 240° C. for 5 minutes gives a black product less flammable than the starting product and still retaining about 80% of its mechanical properties. A similar article, at 220° C. for 12 hours gives a product which is dark grey and completely nonflammable. Its strength is less, but is still about 40% of the original strength. The heating is preferably at 200 to 300° C. for from 1 minute to 12 hours. The heat-treatment temperature must not be below 200° C. and it is desirable at least to start the heat-treatment in a chamber below 300° C.

The following examples illustrate the invention.

EXAMPLE 1

10 parts of a fabric made from continuous yarn of 100 decitex and composed of acrylonitrile homopolymer, and weighing 100 g./m.$^2$, is treated for 1 hour at 130° C. in a bath containing (by weight): crystallised copper sulphate, 1 part; sodium bisulphite in 35% aqueous solution, 1 part; and water, 98 parts. The bath has a pH of 3. The fabric is then washed in running water and dried. The content of fixed copper is 2.2%.

Finally, the fabric is heated in a ventilated stenter for 5 minutes at 240° C. A comparison fabric which has not been treated with cuprous ions is similarly heated.

The heat treated fabric shows greatly reduced flammability, while retaining more than 80% of its initial mechanical properties. In addition, it has a fine black appearance which is fast to light and washing.

On the contrary, the fabric which has been simply heated under the same conditions, but without treatment with cuprous ions, has a brown color and is not less flammable than the initial fabric.

The following table shows the small loss in mechanical qualities after treatment with cuprous ions and heat treatment.

| Fabric | Breaking load of the individual yarns (in g.) | Elongation at break (in percent) |
|---|---|---|
| Initial fabric | 380 | 17.2 |
| Fabric treated according to the invention | 324 | 15 |

EXAMPLE 2

10 parts of a fabric, formed of yarns with a count of 450 decitex and consisting of copolymer fibers containing 95% by weight of acrylonitrile and 5% by weight of methyl methacrylate, are treated for 2 hours at 100° C. in a bath having a pH of 3 and containing (by weight): crystallised copper sulphate, 1 part; hydroxylamine sulphate, 0.5 part; and water, 98.5 parts. The fabric is then washed in running water and dried. It has a fixed copper content of 2.2%.

Finally the fabric is heated in a ventilated stenter for 5 minutes at 240° C. The treated fabric has the same advantages as that of the previous Example 1. The following results show the small loss in mechanical qualities after this treatment.

| Fabric | Breaking load of the individual yarns (mg.) | Elongation at break (in percent) |
| --- | --- | --- |
| Initial fabric | 1,057 | 31.7 |
| Fabric treated according to the invention | 896 | 32 |

EXAMPLE 3

10 parts of a fabric consisting of continuous yarn of acrylonitrile homopolymers are treated for 1 hour at 130° C. in a bath containing (by weight): crystallised copper sulphate, 0.5 part; 30% commercial solution of glyoxal, 0.6 part; acetic acid, 0.1 part; and water to make 100 parts. The bath has a pH of 3.5. The fabric is then washed in running water and dried. It has a fixed copper content of 1.15%.

Finally, the fabric is heated in a ventilated stenter for 5 minutes at 240° C. and then in an oven ventilated with air for 12 hours at 220° C. A completely nonflammable fabric is obtained having a density of 1.460. The yarns of the treated fabric have a breaking load of 150 g., as against 390 g. before the treatment.

EXAMPLE 4

In the same manner as in Example 3, 1.15% of cuprous copper are fixed on a fabric consisting of continuous acrylonitrile-based homopolymer. The said fabric is then heated in a ventilated stenter for 5 minutes at 240° C. and in an air-ventilated oven for 4 hours at 240° C. A completely nonflammable fabric is obtained having a density of 1.452. The initial fabric is readily inflammable and has a density of 1.180.

EXAMPLE 5

5 parts of an acrylonitrile-based homopolymer, as a fine powder, is treated for 1 hour at 130° C. in a bath containing (by weight): crystallised copper sulphate, 0.5 part; 35% aqueous solution of sodium bisulphite, 0.5 part; nonionic wetting agent, 0.1; and, water to make 100 parts. The bath has a pH of 3.5. The polymer is then washed in running water and dried.

The powdered polymer is heated in a thin layer in an oven for 6 hours at 240° C. A nonflammable black powder is obtained which is insoluble, but capable of being dispersed, in dimethylformamide.

EXAMPLE 6

As in Example 5, an acrylonitrile-based polymer is treated with cuprous ions, and the polymer is then dried and powdered. It is then pressed at ordinary temperature and under a pressure of 500 bars into a shaped object. This object is heated for 6 hours at 240° C., and the product obtained has a hardness similar to that of poly(methylmethacrylate) and is nonflammable.

I claim:

1. Process for the production of polyacrylonitrile-based articles of substantially washing and light-fast, deep shades and reduced flammability which comprises contacting an article made of an acrylonitrile polymer selected from the class consisting of polymers, copolymers, and graft copolymers of 85 to 100% by weight of acrylonitrile and up to 15% by weight of a halogen free ethylenic monomer copolymerisable therewith, with an aqueous solution containing cuprous ions at a pH of 2 to 5 and at a temperature between 95° and 130° C. until the said article has 0.1 to 3% by weight of copper fixed thereon, and then heating the said article in the presence of a current of air at 200° to 300° C. for from 1 minute to 12 hours until its flammability has been substantially reduced.

2. Process according to claim 1, in which the said article is a fabric.

3. Polyacrylonitrile-based articles of substantially washing and light-fast deep shades and of low flammability, insoluble in dimethylformamide, retaining their colour in the presence of strong reducing agents, and containing 0.1 to 3% by weight of fixed copper, produced by the process of claim 1.

4. Process according to claim 1, in which the said article is polyacrylonitrile fabric.

5. Polyacrylonitrile fabrics of substantially washing and light-fast deep shades and of low flammability, insoluble in dimethylformamide, retaining their colour in the presence of strong reducing agents, and containing 0.1 to 3% by weight of fixed copper, produced by the process of claim 4.

References Cited

UNITED STATES PATENTS 3,092,519 6/1963 Olson.
3,242,000 3/1966 Lynch _____ 117—46

NORMAN G. TORCHIN, *Primary Examiner.*

THOMAS J. HERBERT, JR., *Assistant Examiner.*

U.S. Cl. X.R.

8—55; 117—46